July 11, 1967     G. HENDRIX     3,330,053
EDUCATIONAL SYSTEM

Filed Dec. 7, 1964     4 Sheets-Sheet 1

RED    BLUE    GREEN    YELLOW    ORANGE    BROWN    GRAY

INVENTOR
Gertrude Hendrix

BY Irons, Birch, Swindler & McKie
ATTORNEYS

July 11, 1967  G. HENDRIX  3,330,053
EDUCATIONAL SYSTEM
Filed Dec. 7, 1964  4 Sheets-Sheet 2

INVENTOR
Gertrude Hendrix

BY Leons, Birch, Swindler & McKie
ATTORNEYS

July 11, 1967  G. HENDRIX  3,330,053
EDUCATIONAL SYSTEM
Filed Dec. 7, 1964  4 Sheets-Sheet 3

INVENTOR
Gertrude Hendrix

BY
ATTORNEYS

July 11, 1967 G. HENDRIX 3,330,053
EDUCATIONAL SYSTEM
Filed Dec. 7, 1964 4 Sheets-Sheet 4

INVENTOR
Gertrude Hendrix

BY *Irons, Birch, Swindler & McKie*
ATTORNEYS

United States Patent Office 3,330,053
Patented July 11, 1967

3,330,053
EDUCATIONAL SYSTEM
Gertrude Hendrix, 1108 W. Park,
Champaign, Ill. 61820
Filed Dec. 7, 1964, Ser. No. 416,423
16 Claims. (Cl. 35—30)

This invention relates to an educational system, and more particularly to an educational system which aids in the development of mathematical concepts.

The clarification of the concept of natural number is an achievement of modern mathematics less than a century old. It throws a light on the nature of counting which has not been heretofore fully understood. As a matter of fact, the current practice of having little children memorize the names of numbers in order, before they are aware of the concepts referred to by the numerical names, may actually create a serious barrier to a clear concept of a number. This barrier may remain with some individuals for their lifetime.

Verbal numerals which have been memorized in sequence can be matched one-to-one with the elements of a set, by a person who is not really counting at all. What he does looks like counting and sounds like counting. He learns that the last word of his chant is the approved answer. But many a child who can carry out this so-called counting act still does not know what is meant by the "number of things" to be counted. When asked to count the number of fingers on his hand, the child might as well match his fingers with the words of a nursery rhyme such as "Little Miss Muffet sat on a tuffet . . . " Many children achieve no more by being able to answer "five" than if they had used the nursery rhyme and answered "on."

It is well known that memorizing names and recipes creates serious barriers to the comprehension of the concepts referred to by the names, and of the principles basic to the mathematical recipes.

Many parents and nursery school teachers would like to prevent formation of this superficial crust in the minds of little children if they knew how. The concept of one-to-one matching is basic to natural number. One-to-one matching is a play activity which must be promoted. If there were a durable toy or game for the purpose—something simple, attractive and easy to use—they would welcome it.

To teach little children these concepts, a motive must be developed. Trying to force a small child to learn is a sure way of creating another kind of barrier equally serious—distaste and resentment toward whatever ideas are associated with the activity. One must not try to force a little child into "playing" at one thing too long a time, and whatever the toy, it must permit at least partial success within brief time intervals.

It is, therefore, an object of this invention to provide an educational system which will assist in developing mathematical concepts.

It is a further object of this invention to provide an educational system for assisting in teaching the concept of natural number.

It is a further object of this invention to provide an educational system, for assisting in teaching children the natural number concept, which is simple, attractive, easy to use, and will not build up a distaste for or resentment toward the ideas associated with the system.

It is still a further object of this invention to provide a method for teaching the natural number concept.

Another object of this invention is to provide an educational game which may be used to teach mathematical concepts.

Still another object of this invention is to provide an educational system which will assist in developing the mathematical concept of natural number and specifically the numbers two, four, three, one, five, six and zero, the ordering of these numbers by the relation, "less than," and hence the awareness that there must be another number one greater than six, another that is one more than that, and so on—in other words, the concept of finite cardinal number.

Additional objects and advantages of the invention will become apparent from the following descriptions and drawings.

The invention which accomplishes the above objects and purposes may be described as a game for assisting in the development of mathematical concepts comprising a first group of objects, the objects of said first group being of varied colors so that objects having the same color may be selected from said first group of objects and matched together; a second group of objects, the objects of said second group being of varied shapes with no correlation between the color and the shape of the objects and with all of the objects of the same shape being the same size so that objects having the same size and shape may be selected from said second group of objects and matched together with the color of the objects acting as a distracter; a third group of objects, the objects of said third group being of varied shapes with no correlation between the shape of the object and its size or color so that objects having the same shape may be selected from said third group of objects and matched together with the color and size of the objects being distracters; a fourth group of objects, the objects of said fourth group having varied numbers of figures on at least one portion of the object with no correlation between the number of figures on said portion of said object and the color, size or shape of the figures so that objects having the same number of figures may be selected from said fourth group of objects and matched together with the color, size and shape of the figures being distracters.

Preferably, the game also includes a fifth group of objects, the objects of said fifth group having varied numbers of sides with no correlation between the number of sides of the object and the color, size and shape of the object so that objects having the same number of sides may be selected and matched with the color, size and shape of the objects acting as distractors.

In the presently preferred embodiment, the objects of the first, second, third and fifth groups are mounted on matchers or blocks having two sections on their upper surface and the objects of the fourth group are matchers or blocks having varied numbers (including zero) of figures on the sections so that with each of the groups two or more matchers, having at least one matching section, may be selected from the group of matchers and matched together. The position on the matchers of the objects in groups two, three, and five and the position on the matchers of the figures in group four have no correlation to the matching criterion of the particular group, so that the relation of the objects or figures to their matchers will not become part of the matching criterion.

Preferably, the game also includes a plurality of assisters, each of which is comprised of a pair of elements joined by a connecting means so that in the use of said fourth group of objects one of the elements of an assister may be placed on one of the figures of a first object and the other element of the assister may be placed on one of the figures of a second object. By using a number of these assisters and by placing one element from each assister on one of the figures of the first object and the other element from each assister on one of the figures of a second object, the user may be certain that the two objects match if each of the assisters which is used has one element on each of the objects.

The invention which accomplishes the above objects and purposes may also be described as a method of exposing students to mathematical concepts comprising placing before a student a first mixture of objects having varied colors, allowing the student to play with the objects until the student can select objects having at least one color in common and match the objects together, removing said first mixture of objects; placing before the student a second mixture of objects having varied shapes with no correlation between the shape of the object and its color and with all objects of the same shape having the same size, permitting the student to play with the objects until the student can select and match congruent objects without being distracted by the colors of the objects, removing the second mixture of objects from before the student; placing before the student a third mixture of objects having varied shapes with no correlation between the shape of the object and its size or color, permitting the student to play with the objects until he can select and match objects having the same shape without being distracted by the color or size of the objects, removing the third mixture of objects from before the student; placing before the student a fourth mixture of objects having varied numbers of figures on at least one portion of the object with no correlation between the number of figures on the object and the color, size or shape of the figures, permitting the student to play with the mixture of objects until the student can select and match objects having the same number of figures thereon without being distracted by the color, size and shape of the figures and can arrange the objects in sequence with each object having one less figure than the preceding object, whereby the student has been exposed to the natural number concept.

Preferably, the method includes the additional steps of removing the fourth mixture of objects from before the student, placing before the student a fifth mixture of objects having varied numbers of sides with no correlation between the number of sides of the object and its color, size or shape, and permitting the student to play with the objects until the student can select and match objects having the same number of sides without being distracted by the color, shape and size of the objects.

If the student already knows how to count, the game would start by the instructor placing the fifth mixture of objects before the student and letting the student play with the objects until he is able to select and match objects having the same number of sides without being distracted by the color, shape or size of the objects. If after waiting for a period, the student, who can count, does not master this fifth mixture of objects, it is known that he needs training in the natural number concept.

The invention having been generally described, the preferred specific embodiments will be discussed in detail with reference to the accompanying drawings.

Figure 1:
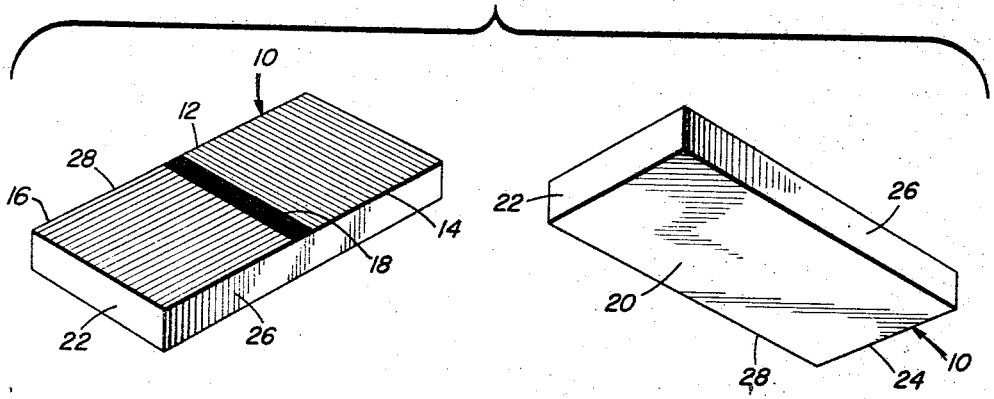
FIGURE 1 is a perspective view of matchers to be used with this invention.

Though he invention may be used with students of various ages, it will be most advantageously used when started with the young child, preferably about two years old. With such a child the first need is for a matching game much simpler than one which requires one-to-one matching. The simplest and most attractive abstractions to most two-year olds seem to be bright colors. Hence the game starts with a set of color matchers which may be in the form of "domino" blocks. Such matchers may be seen in FIGURE 1. The color indications designated in FIGURE 1 are used in all of the figures. These colors have been arbitrarily selected and it will be appreciated that any colors may be used. The matchers, indicated generally as 10, have their upper surfaces 12 divided into two sections 14 and 16 by a divider marking 18. Each of the sections is colored. The two sections 14 and 16 may be colored the same color or they may be varied colors, for example, with red on one section and green on the other. The undersurface or bottom 20 of the block is plain and, if the block is made of wood, may be just the natural color of the wood or may be any color which will not be confused with the colors used on the upper surface of the block. The ends 22 and 24 and the sides 26 and 28 of the blocks preferably are colored the same color as bottom 20 so as not to be confused with the colors on the upper surface of the block.

Figure 2:
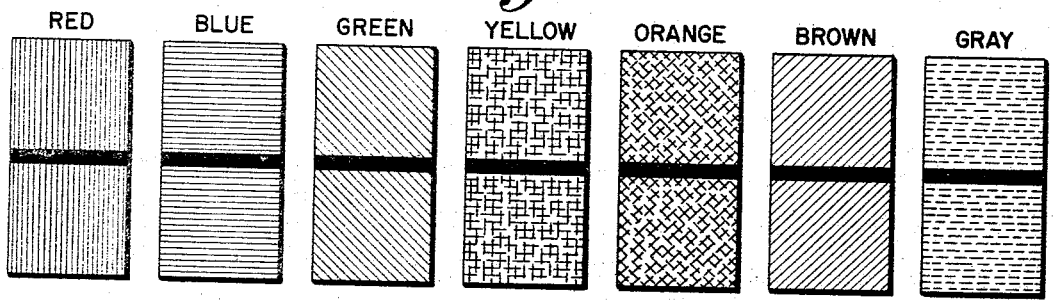
FIGURE 2 is a plan view of the doubles of a first set of matchers.

Referring to FIGURE 2, it may be seen that there are seven doubles in this first set of matchers. Doubles have the same color on both sections of the upper surface of the matcher. As illustrated in FIGURE 2, there is one double matcher with red on both sections, one with blue on both sections, one with green on both sections, one with yellow on both sections, one with orange on both sections, one with brown on both sections, and one with gray on both sections. Of course, any colors can be used and, if desired, even more doubles can be provided to include more colors. It is preferred, however, to use the seven doubles which correspond with the seven doubles used in a domino game. In conjunction with the seven doubles, there are twenty-one additional matchers. Each of these twenty-one matchers has different colors on its two sections. Thus, it may be seen that there will be a matcher having red on one section and blue on the other. There will be another matcher having red on one section and green on the other. Still another matcher will have red on one section and yellow on the other. Another matcher will have red on one section and orange on the other. These combinations are continued until there are twenty-one matchers having all the possible combinations of the seven colors used with the doubles. Of course, as with any of the sets to be described below, any number of matchers may be used as long as there are enough matchers to provide a group or mixture from which the student may select matching matchers.

Figure 3:
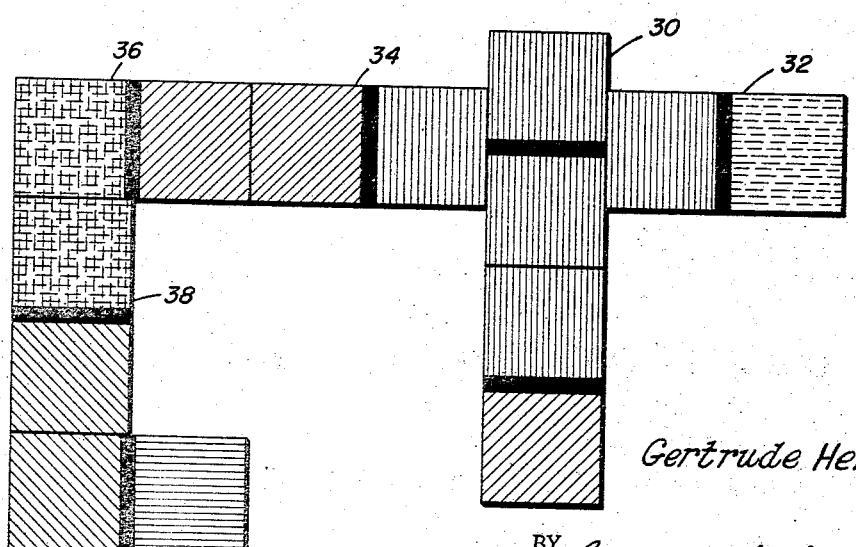
FIGURE 3 is a plan view of a group of matchers from the first set of matchers showing how the matchers are used.

Referring to FIGURE 3, it can be seen how the blocks are used. The blocks are first mixed together and placed in a group before the child. The child is then allowed to play with the blocks. The instructor may also play with the blocks and let the child join in with the matchings. For example, the game may be started with a double red block 30. A block 32 having one green section and one red section is matched with block 30 with the red section of block 32 adjacent block 30. A block 34 having a brown section and a red section is then matched with block 30. A subsequent block 36 having a yellow section and a brown section is matched with block 34 with the two brown sections adjoining. A block 38 having a yellow section and a green section is then matched with the yellow section of block 36 with the two yellow sections being adjacent. The matching is continued until as many of the blocks as will fit have been used. The blocks may be laid in any direction as long as the matching section of the new block is placed adjacent the corresponding section of the block already in the design.

When playing with the blocks in the presence of the child, the instructor rejects wrong matches. The child's first accidental successes are rewarded by enthusiastic acceptance and very soon the child begins to select blocks that will "play" without having to try several at random. At this point, and not before, the child is ready for the name of each color he can recognize. In fact, he will want to name the colors himself if no one supplies their names.

Figure 4:
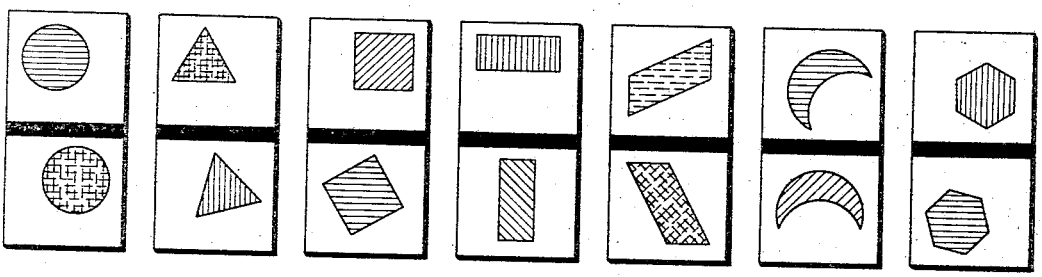
FIGURE 4 is a plan view of the doubles of a second set of matchers.
Figure 5:
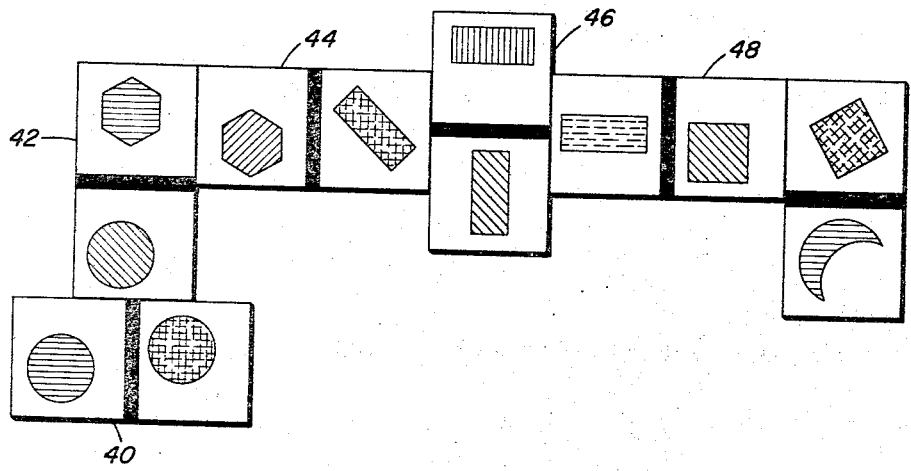
FIGURE 5 is a plan view of a group of matchers from the second set of matchers showing how the matchers are used.

Congruence—things alike in both size and shape—is probably the next simplest concept to exploit. Referring to FIGURES 4 and 5, it may be seen that this second set of matchers is comprised of blocks having a geometric figure on each of their sections. FIGURE 4 illustrates the doubles of this set with, for example, one block with a circle on each section, one block with a triangle on each section, and continuing on in this manner through seven doubles. Once again there are preferably twenty-eight blocks in a complete set with all the various combinations included. As may be seen, the colors and the position of the objects on the sections of the blocks are varied but there is no correlation between the colors of the objects or the positions of the objects on the blocks and the shapes of the objects. The colors and positions of the objects act as distracters and the student must match the objects based on their size and shape alone. The objects, of course, could all be of one color and in one position rather than being of varied colors and in varied positions, and the color and positioning would still be a distracter. Play with this set is similar to that with the first set, with the adult rejecting the child's wrong matches and rewarding enthusiastically his first accidental successes until the child can recognize the congruence of like objects.

Figure 6:
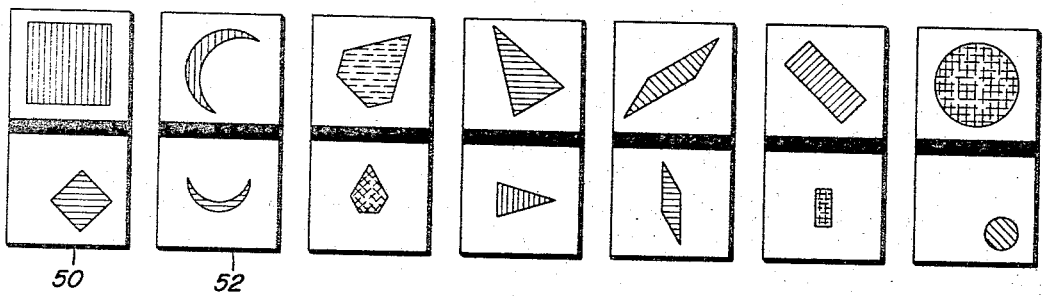
FIGURE 6 is a plan view of the doubles of a third set of matchers.

Referring to FIGURE 5 we find a pattern formed by the play with this set. Play could start with, for example, double block 40 having two circles thereon. Block 42, which has a circle on one section and a hexagon on the other section, is placed adjacent block 40 with the section having the circle immediately adjacent block 40. Block 44, having a hexagon on one section and a rectangle on the other, has been joined with block 42 with the hexagon of block 44 adjacent the hexagon of block 42. Block 46, which is a double block having a rectangle on each section, is placed crosswise adjacent the rectangle of block 44. Block 48, which has a rectangle on one section and a square on the other, is matched with block 46 with the section having the rectangle immediately adjacent to block 46. This design is continued in similar manner until every block has been used, or until the game is blocked and the remaining blocks cannot be used. When the child has mastered this set of blocks, he is ready to attempt the third set of blocks which are represented in FIGURES 6 and 7.

The object with this third set of blocks is for the child to match similar shapes which are not the same color, nor the same size, nor in the same position on the blocks. As may be seen in FIGURE 6, the doubles of this set of blocks have objects of various shapes on each of its sections with no correlation between the shape of the object and its color, size or position in the section. For example, block 50 has a large red square in one position on one section and a small green square in another position on the other section. Block 52 has a large red half-moon in one position on one section and a small blue half-moon in another position on the other section. The remaining double blocks have various other shapes. Here again, the complete set is preferably made up of twenty-eight blocks, with the other twenty-one blocks comprising all of the possible combinations of shapes, as for example a square on one section of the block and a half-moon on the other, a half-moon on one section of the block and a triangle on the other, and so on, until all the possible combinations of shapes have been used.

Figure 7:
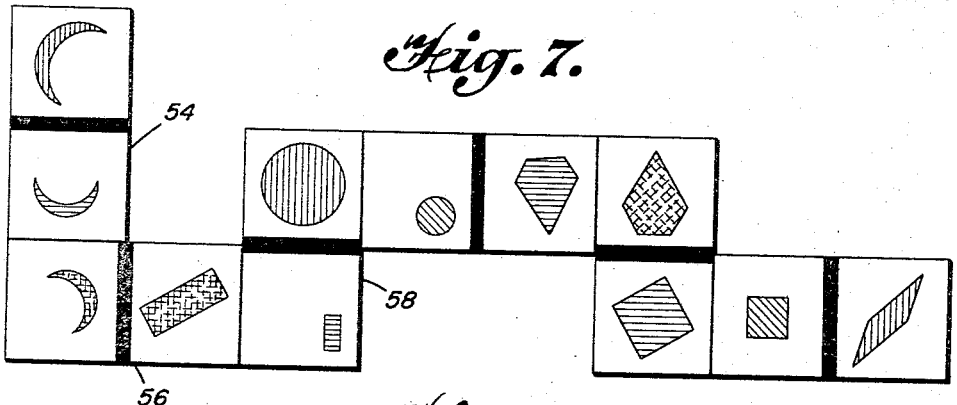
FIGURE 7 is a plan view of a group of matchers from the third set of matchers showing the use of the third set.

FIGURE 7 represents a pattern created by the play with the blocks. The play is similar to that of the other sets, with the child selecting blocks from a mixture and matching blocks which have figures of the same shape. For example, double block 54, having a half-moon on each of its sections, is joined to block 56 which has a half-moon on one of its sections and a rectangle on the other section, with the half-moon of block 56 being adjacent one of the half-moons of block 54. Block 58 having a rectangle on one of its sections and a circle on the other section, is joined to block 56 with the rectangle of block 58 being adjacent to the rectangle of block 56. This design is continued until all of the blocks have been used. There is no correlation between the size and color of the block, and the shape of the object on the block.

Figure 10:
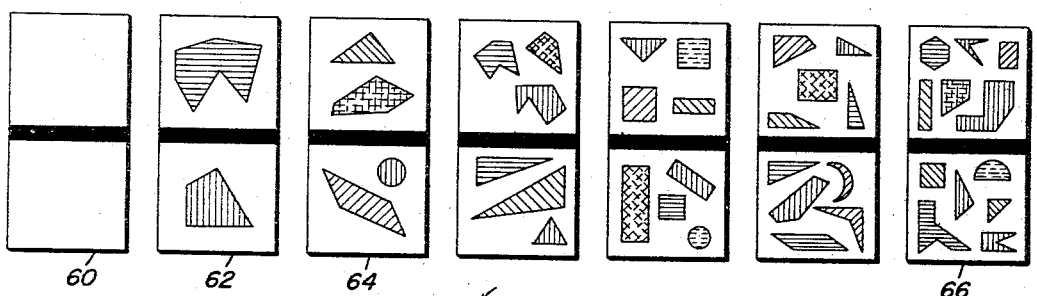
FIGURE 10 is a plan view of the doubles of a fourth set of matchers.
Figure 11:
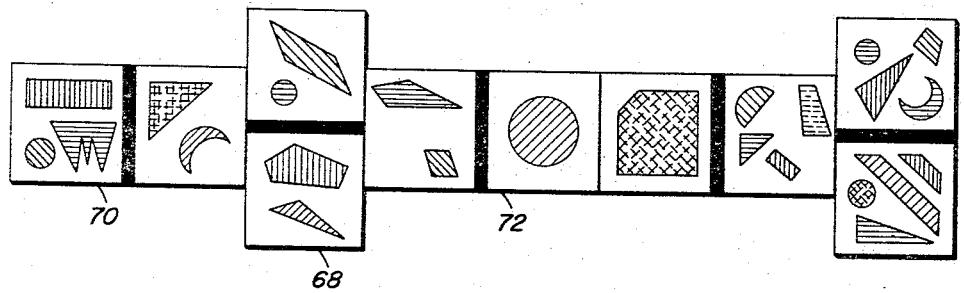
FIGURE 11 is a plan view of a group of matchers from the fourth set of matchers showing the use of the fourth set.
Figure 12:
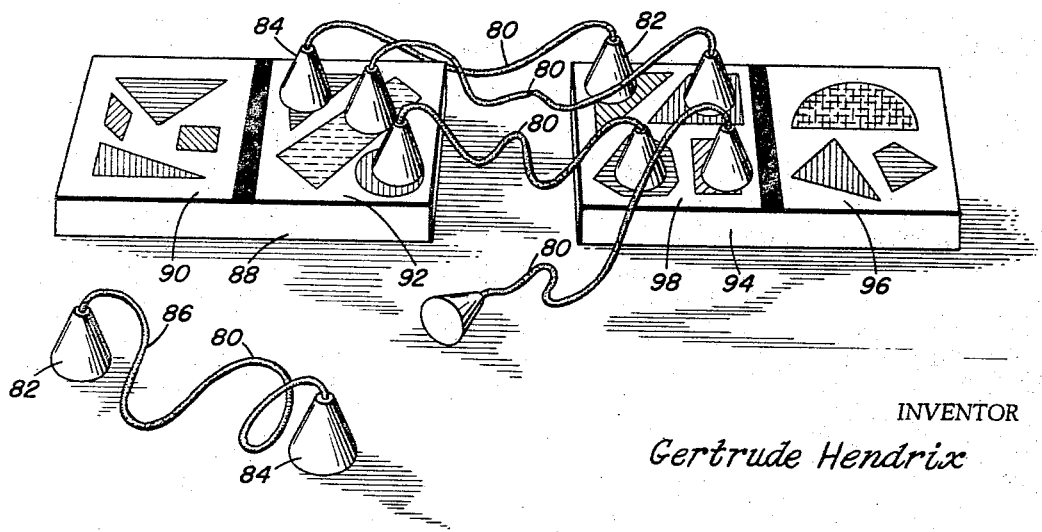
FIGURE 12 is a perspective view of a pair of the matchers of the fourth set together with assisters which are used in conjunction with the fourth set.

After the child has mastered this set of blocks, he is ready to move on to the more difficult one-to-one correspondence set illustrated in FIGURES 10 through 12. In this set the student must match the number of figures on one section of the matcher to the number of figures on one section of another matcher. There is no correlation between the color, size, shape or positioning of the figures and the number of figures on one section of any given matcher. Thus, the color, size, shape and positioning of the figures are distracters. The doubles of this set are represented in FIGURE 10. Block 60 has no figures on either section. Block 62 has one figure on each section. Block 64 has two figures on each section. This sequence is continued up through block 66, which has six figures on each section. Play with this set is similar to that of the other sets, with the child matching blocks having the same number of figures.

Referring to FIGURE 11, double block 68, which has two figures on each section is matched to block 70 which has two figures on one section and three figures on the other section with the section of block 70, which has two figures adjacent to block 68. Block 72, which has two figures on one section and one figure on the other section, is matched to block 68 with the section of block 72 having two objects adjacent block 68. The matching is continued in similar fashion until all of the blocks which can be played have been used.

Since this set requires that the child be able to perceive at a glance up to six figures at one time, it is desirable to provide some means to help him perceive these figures. To do this, assisters, illustrated in FIGURE 12, are provided. Each of assisters 80 consists of a pair of elements 82 and 84, joined by a cord 86 or other connecting means. FIGURE 12 illustrates a first block 88 having sections 90 and 92 and a second block 94 having sections 96 and 98. As illustrated, an attempt is being made to match section 92 of block 88 with section 98 of block 94. Four assisters have one element placed on each of the four figures on section 98 of block 94. Three of the elements of the assisters are placed on the three objects of section 92 of block 88. There is one element of one assister left over. This indicates to the student that these sections of these blocks do not match and he must select another section to match with section 92 of block 88. The student can select as many assisters as are needed and, when a proper match has been made, one of the elements of each assister will rest on an object on each of the two matching sections of the two blocks without any elements being left over. The assisters may be of any suitable construction so long as each assister has two ends which may rest on corresponding figures on two blocks. The assisters illustrated have weights on each end of a string and the weights rest on the figures on the blocks.

When a child becomes able to select blocks that will match without having to use the assisters, he has learned the concepts of three, two, five, one, six, four and possibly zero. The child may now be taught the names of the number concepts which he has learned. Then, using the seven blocks which contain blank sections, he can order the sets having figures on the non-blank sections according to the relation, "less than." That is, he can place the block having two figures on its non-blank section next to the block having three figures on its non-blank section and then place the block having one figure on its non-blank section next to the one having two figures and so on until he has placed all seven blocks in their proper order with each successive block having one figure "less than" the previous block. The assisters can be used for this purpose to identify the one-less-than condition.

In is the one-left-over phenomenon which provides the ordering from blank to six. As soon as the child can make this ordered array, he realizes that there must be another kind of set that has one more element than a "six" set; and another beyond that; and another . . . etc. At this stage he has learned—or acquired—the concept of natural number, sometimes called "the concept of finite cardinal number." He will never confuse size, shape or color with number. It now makes sense for him to memorize verbal numerals in order and to use the words themselves for assisters. If the words are used in the proper order when they are matched with the figures in a set, the last word used will name the natural (or cardinal) number to which the whole set of figures belongs.

The child is now ready to count.

Figure 8:
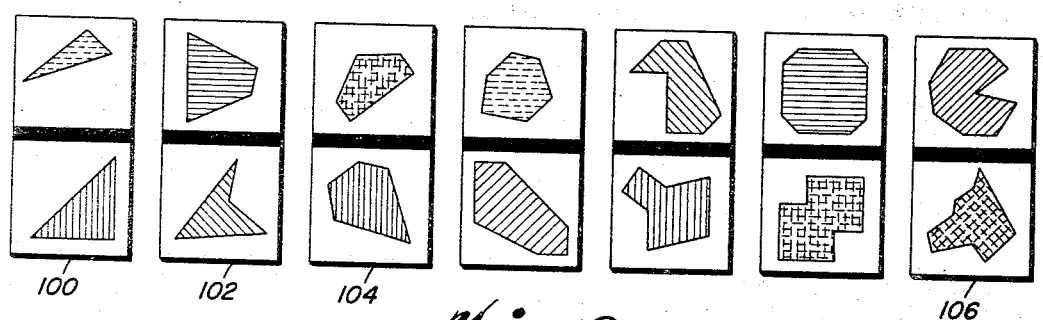
FIGURE 8 is a plan view of the doubles of a fifth set of matchers.

At this point, the student may use the fifth set of matchers which provides practice in counting—counting with words which are the names of concepts which he already possessed at the time the words were learned. This fifth set of matchers requires the child to match objects having the same number of sides with color, size, shape and positioning of the objects bearing no correlation to the number of sides of the object. FIGURE 8 illustrates the doubles of this set. Block 100 has an object having three sides on each of its sections. Block 102 has an object having four sides on each of its sections. Block 104 has an object having five sides on each of its sections. This sequence containues up to block 106 which has an object having nine sides on each of its sections. In this set, instead of counting sides, vertices may be counted, as there will be the same number of vertices as there are sides in any given object. The use of these blocks is similar to all of the previous blocks, with the student matching the object on one section of a block to the object on one section of another block. Matching objects have the same number of sides or vertices.

Figure 9:
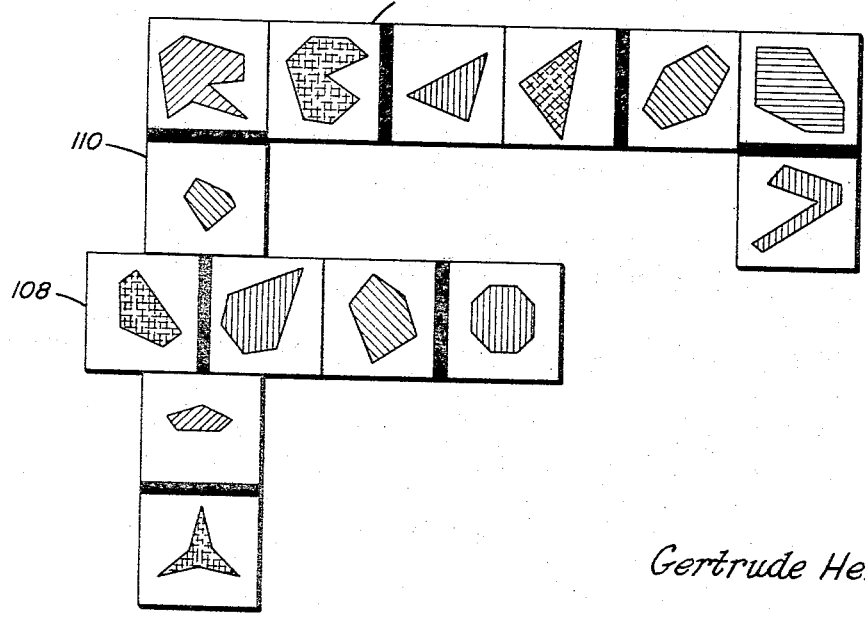
FIGURE 9 is a plan view of a group of matchers from this fifth set of matchers showing the use of the fifth set.

As seen in FIGURE 9, double block 108 having objects with five sides on each of its sections is used to start. Block 110 which has an object also having five sides on one of its sections is joined to block 108 with this section being positioned adjacent block 108. The other section of block 110 has an object having eight sides. Block 112, having an object on one of its sections having eight sides, is matched to block 110. This pattern is continued until as many as possible of the twenty-eight blocks in the set have been used.

Since it is not necessary that this fifth set be used to teach the child the natural number concept, the series could end with the use of the fourth set. However, the fifth set gives the child practice counting after he has learned the natural number concept and, by following the pattern used in teaching the student the natural number concept, the natural number concept is further impressed on the child's mind while he is counting.

For children four years or older, or for children who may already know how to count, the fifth set is used as a test set. The use is the same as has been previously described. If the child can play successfully with this set as soon as he has been shown the seven "doubles," he would not need any of the concept development activity provided by the first four sets. The objects in the fifth set have as many as nine sides or vertices, too large a number to be taken in at a glance. Thus to play with the fifth set, one must be able to count. If the child is not able to play with the fifth set, it indicates that he does not understand the natural number concept and he should start with the first set. After he has learned the natural number concept from using the first four sets, he can go on to the fifth set to practice using the concept with his counting.

To use the game, the instructor will preferably place the various sets before the child in the prescribed order. If the child is in the two-year age group, the instructor will preferably start with the first set and progress through the second, third, fourth and, finally fifth set. It will be understood, of course, that the instructor could start with the second or third set though the results may be less satisfactory. If the child can count, the instructor starts with the fifth set and, if necessary, goes back to the first set and then follows with the entire series. The instructor places the twenty-eight matchers before the child with the group of matchers being mixed. Initially, the child may need to have the instructor demonstrate how to play with the matchers. In any case, the instructor should reject any wrong matches and praise the first accidental proper match and subsequent proper matches until the child has mastered a set, at which time the instructor removes the set and places the next successive set before the child. It is not, of course, necessary that the child play with all of the sets of the game at one sitting. In actual use, play with the successive sets will be spread out over a period of days, weeks, months or even years.

There is described and illustrated here what are considered to be preferred embodiments of the invention. Modifications and variations will become readily apparent to those skilled in the art without departing from the scope of the invention which is defined in the appended claims.

I claim:

1. A game for assisting in the development of mathematical concepts comprising:
   a first group of matchers, each having a first type of objects thereon, the objects of said first type being of varied colors so that objects having the same color may be selected from said first group of matchers and matched together;
   a second group of matchers, each having a second type of objects thereon, the objects of said second type being of varied shapes with no correlation between the color and the shape of the objects and with all of the objects of the same shape being the same size so that objects having the same size and shape may be selected from said second group of matchers and matched together with the colors of the objects acting as a distracter;
   a third group of matchers, each having a third type of objects thereon, the objects of said third type being of varied shapes and sizes with no correlation between the shape of the object and its size or color so that objects having the same shape may be selected from said third group of matchers and matched together with the color and size of the objects acting as distracters;
   a fourth group of matchers, each having a fourth type of objects thereon, the objects of said fourth type consisting of varied numbers of figures, with no correlation between the number of figures on said matchers and the color, size or shape of the figures so that matchers having the same number of figures may be selected from said fourth group of matchers and matched together with the color, size and shape of said figures acting as distracters.

2. The game of claim 1 wherein the objects of said first, second and third groups of matchers are mounted on matchers having at least two sections with one type of object in at least one section of said matchers, and the objects of said fourth group of matchers are mounted on matchers having at least two sections and having varied numbers of figures in at least one of the sections, so that with each of the groups, matchers having at least one matching section may be selected from a group of matchers and matched together.

3. The game of claim 1 wherein the position on the matchers of the objects of said second and third groups and the position on the matchers of the figures of said fourth group have no correlation to the matching criterion of the particular group so that the relation of the objects or figures to their matchers will not become a part of the matching criterion.

4. The game of claim 1 including a fifth group of matchers, each having a fifth type of objects thereon, the objects of said fifth type having varied numbers of sides with no correlation between the color, size and shape of the objects and the number of sides of the objects so that objects having the same number of sides may be selected from said fifth group of matchers and matched together with the color, size and shape of the objects acting as distracters.

5. The game of claim 4 wherein the object of said first, second, third, and fifth type of objects are mounted on matchers having two sections on their upper surfaces with one object in each section, and the objects of said fourth type of objects are mounted on matchers having their upper surfaces divided into two sections and having varied numbers of figures in the sections, so that matchers of each group having at least one matching section may be selected from a respective group of matchers and matched together.

6. The game of claim 4 wherein the position on the matchers of the objects of said second, third, and fifth groups and the position on the matchers of the figures in said fourth group have no correlation to the matching criterion of the particular group so that the relation of the objects or figures to their matchers will not become a part of the matching criterion.

7. The game of claim 1 including a plurality of assisters, each of said assisters being comprised of a first element for contacting a figure on one of the matchers of said fourth group, a second element for contacting a figure on another of the matchers of said fourth group, and means connecting said elements together whereby a student may use a plurality of assisters to connect the figures of one matcher to the figures of another matcher and in that way, determine if the two matchers have the same number of figures.

8. A game for assisting the development of mathematical concepts comprising:
    a first group of matchers, each having a first type of objects thereon, the objects of said first group having varied shapes with no correlation between the color and the shape of the objects and with all of the objects of the same shape being the same size so that objects having the same size and shape may be selected from said group of matchers and matched together with the colors of the objects acting as a distracter, and
    a second group of matchers, each having a second type of objects thereon, with the objects of said second group being of varied shapes and sizes with no correlation between the shape of the object and its size or color so that objects having the same shape may be selected from said second group of matchers and matched together with the color and size of the objects acting as distracters.

9. The game of claim 8 including a third group of matchers, each having a third group of objects thereon, the objects of said third type consisting of varied numbers of figures, with no correlation between the number of figures and the color, size or shape of the figures so that matchers having the same number of figures may be selected from said third group of matchers and matched together with the color, size and shape of the figures acting as distracters.

10. A game for assisting in the development of mathematical concepts comprising:
    a first group of matchers, each having a first type of objects thereon, the objects of said first type being of varied shapes with no correlation between the shape of the object and its size or color so that objects having the same shape may be selected from said first group of matchers and matched together, with the color and size of the objects acting as distracters, and
    a second group of matchers, each having a second type of objects thereon, the objects of said second type having varied numbers of figures of varied size and shape with no correlation between the number of figures and the color, size or shape of the figures, so that matchers having the same number of figures may be selected from said second group of matchers and matched together, with the color, size and shape of said figures acting as distracters.

11. The game of claim 9 including a fourth group of matchers, each having a fourth type of objects thereon, the objects of said fourth type having varied numbers of sides with no correlation between the color, size and shape of the objects and the number of sides of the objects so that objects having the same number of sides may be selected from said fourth group of matchers and matched, with the color, size and shape of the objects acting as distracters.

12. The game of claim 10 including a third group of matchers, each having a third type of objects thereon, the objects of said third type having varied numbers of sides with no correlation between the number of sides of the object and color, size and shape of the object so that matchers having objects having the same number of sides may be selected and matched together, with the color, size and shape of the objects acting as distracters.

13. A method for exposing students to mathematical concepts comprising: placing before a student a first mixture of objects having varied colors; allowing the student to play with the mixture of objects until the student can select objects having at least one color in common and match the objects together; removing said first mixture of objects; placing before the student a second mixture of objects having varied shapes with no correlation between the shape of the objects and the color of the objects and with all of the objects of the same shape having the same size, permitting the student to play with the mixture of objects until the student can select and match congruent objects without being distracted by the colors of the object; removing the second mixture of objects from before the student; placing before the student a third mixture of objects having varied shapes and sizes with no correlation between the shape of the objects, and the size or color of the objects, permitting the student to play with the mixture of objects until he can select and match objects having the same shape without being distracted by the color or size of the objects; removing the third mixture of objects from before the student; placing before the student a fourth mixture of objects having varied numbers of figures on at least one portion of the object with no correlation between the number of figures on the object and the color, size and shape of the figures; permitting the student to play with the mixture of objects until the student can select and match objects having the same number of figures on at least one portion thereof without being distracted by the color, size and shape of the figures, and can arrange the objects in sequence with each object having one less figure than the preceding object, thereby the student has acquired the natural number concept.

14. The method of claim 13 including the additional steps of: removing the fourth mixture of objects from before the student and placing before the student a fifth mixture of objects having varied numbers of sides with no correlation between the number of sides of the objects and the color, shape and size of the objects; permitting the student to play with the mixture of objects until the student can select and match objects having the same number of sides without being distracted by the color, shape and size of the objects.

15. A method for exposing a student to mathematical concepts comprising: placing before a student a first mixture of objects having varied shapes with no correlation between the shape of the object and its color and with all objects of the same shape having the same size; permitting the student to play with the mixture of objects until the student can select and match congruent objects without being distracted by the colors of the objects; removing the first mixture of objects from before the student; placing before the student a second mixture of objects having varied shapes and sizes with no correlation between the shape of the object and its size and color, permitting the student to play with the mixture of objects until he can select and match objects having the same shape without being distracted by the color and size of the objects, removing the second mixture of objects from before the student; placing before the student a third mixture of objects having varied numbers of figures on at least one portion of the object with no correlation between the number of figures on the object and the color, size and shape of the figures; and permitting the student to play with the mixture of objects until the student can select and match objects having the same number of figures on at least one portion thereof without being distracted by the color, shape and size of the figures, and can arrange the objects in sequence with each object having one less figure than the preceding object whereby the student has been exposed to the natural number concept.

16. The method of claim 14 including: removing the third mixture of objects from before the student; placing before the student a fourth mixture of objects having varied numbers of sides with no correlation between the number of sides of the object and its color, size and shape; and permitting the student to play with the mixture of objects until the student can select and match objects having the same number of sides without being distracted by the color, shape and size of the objects.

References Cited

UNITED STATES PATENTS

| | | | |
|---|---|---|---|
| 793,455 | 6/1905 | Mandelbaum | 273—137 |
| 1,443,346 | 1/1923 | Coble | 273—137 |
| 2,959,871 | 11/1960 | Honkavaara | 35—69 X |

FOREIGN PATENTS

| | | |
|---|---|---|
| 1,330,709 | 5/1963 | France. |
| 163,103 | 5/1921 | Great Britain. |

EUGENE R. CAPOZIO, *Primary Examiner.*

W. GRIEB, *Assistant Examiner.*